(12) United States Patent
Lee et al.

(10) Patent No.: US 7,251,129 B2
(45) Date of Patent: Jul. 31, 2007

(54) TWO-WAY AUTO-LOCKING TABLET PC HINGE

(75) Inventors: Kun-Ho Lee, Taipei (TW); I-Hao Chen, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 11/413,180

(22) Filed: Apr. 28, 2006

(65) Prior Publication Data

US 2006/0279920 A1    Dec. 14, 2006

(30) Foreign Application Priority Data

Jun. 8, 2005    (TW) .............................. 94209564 U

(51) Int. Cl.
*G06F 1/16* (2006.01)
(52) U.S. Cl. .................. 361/683; 361/682; 16/330; 16/340
(58) Field of Classification Search ................ 361/681, 361/682, 683; 16/330, 340, 367
See application file for complete search history.

(56) References Cited

U.S. PATENT DOCUMENTS

| | | | | |
|---|---|---|---|---|
| 5,970,819 A * | 10/1999 | Katoh | ........................ | 74/531 |
| 6,115,886 A * | 9/2000 | Fujita | ........................ | 16/330 |
| 6,175,990 B1 * | 1/2001 | Kato et al. | ................. | 16/334 |
| 6,421,878 B1 * | 7/2002 | Kaneko et al. | ............ | 16/330 |
| 6,481,057 B2 * | 11/2002 | Lin | ........................ | 16/340 |
| 6,553,625 B2 * | 4/2003 | Lin et al. | ................. | 16/342 |
| 6,757,940 B2 * | 7/2004 | Lu et al. | .................. | 16/330 |
| 6,862,779 B1 * | 3/2005 | Lu et al. | .................. | 16/340 |
| 7,047,599 B2 * | 5/2006 | Oshima et al. | ............ | 16/337 |
| 7,082,642 B2 * | 8/2006 | Su | ........................... | 16/340 |
| 7,100,240 B2 * | 9/2006 | Amano | ..................... | 16/303 |
| 7,117,563 B2 * | 10/2006 | Chen et al. | .............. | 16/330 |
| 7,133,280 B2 * | 11/2006 | Love | ...................... | 361/681 |
| 7,155,781 B2 * | 1/2007 | Yamada et al. | ............ | 16/367 |
| 7,187,539 B2 * | 3/2007 | Kim | ...................... | 361/681 |

\* cited by examiner

*Primary Examiner*—Jayprakash Gandhi
*Assistant Examiner*—Ingrid Wright
(74) *Attorney, Agent, or Firm*—Rabin & Berdo, PC

(57) ABSTRACT

A two-way auto-locking tablet PC hinge is described. The two-way auto-locking tablet PC hinge includes a hinge base, a central rotational frame, a shaft, a fixing bracket, a rotational cam, a fixed cam, and two positioners. The fixing bracket, the rotational cam, and the fixed cam are configured on the shaft. A monitor of the tablet PC is fixed on the fixing bracket and the hinge base is fixed on a tablet PC base. The positioners are composed of protrusion blocks and concaves and are axially symmetrically formed on the fixed cam and the rotational cam respectively. When the monitor is parallel to the tablet PC base, the protrusion blocks are engaged with the concaves correspondingly, thereby locking the monitor on the tablet PC.

17 Claims, 2 Drawing Sheets

TWO-WAY AUTO-LOCKING TABLET PC HINGE

RELATED APPLICATIONS

The present application is based on, and claims priority from, Taiwan Application Serial Number 94209564, filed Jun. 8, 2005, the disclosure of which is hereby incorporated by reference herein in its entirety.

FIELD OF THE INVENTION

The present invention generally relates to a tablet personal computer hinge. More particularly, the present invention relates to a two-way auto-locking tablet personal computer hinge.

BACKGROUND OF THE INVENTION

Due to rapid developments in electrical technologies and computer industries, notebook computers are gradually becoming smaller and lighter with each passing day. Notebooks with portable size and weight have been granted an enormous increase in processing speed, and therefore notebook computers have become a popular electrical product. Since notebook computers possess convenient portability and powerful calculation ability, they have become required equipment for most businessmen.

In different operation environments, the notebook computer has to provide different display angles to enhance its demonstration capabilities. However, due to the conventional restricted display angle range, the notebook computer cannot provide a clear image to all viewers. In addition, due to software and hardware improvements, a tablet personal computer (Tablet PC) has been provided that combines the notebook computer with a hand-writable input device on the display. The tablet PC is changing the input habits of computer users and is advancing the information industry beyond a new milestone. A dual-purpose tablet PC with high processing performance combines the hand-writable input device on the display panel and the keyboard input of the notebook computer.

The dual-purpose tablet PC provides a humanized input interface for users who usually work in a mobile environment. The display of a dual-purpose tablet PC can rotate about 180 degrees so that viewers around the tablet PC can easily see the information and images on the display.

As the display of the dual-purpose tablet PC is able to rotate on the tablet PC, effectively fixing the display on the tablet PC is very important. Therefore, there is a need to design a fixing device for effectively fixing the display on the dual-purpose tablet PC.

SUMMARY OF THE INVENTION

It is an object of the present invention to provide a display of the tablet PC without a hook exposed thereon yet able to be locked on a base of the tablet PC.

It is another object of the present invention to provide a two-way auto-locking hinge for a tablet PC so that a display of the tablet PC can be quickly and easily locked or rotated regardless of the display being closed or under a handwriting input mode.

To accomplish the above objectives, the present invention provides a two-way auto-locking tablet PC hinge. The two-way auto-locking tablet PC hinge includes a hinge base, a central rotational frame, a shaft, a fixing bracket, a rotational cam, a fixed cam, and two positioners. The hinge base is coupled to a base of a tablet PC and the central rotational frame is rotatably coupled to the hinge base. The shaft is fixed on the central rotational frame and the fixing bracket is rotatably coupled to the shaft. A display of the tablet PC is fixed on the fixing bracket, and the rotational cam is rotatably coupled to the shaft and is fixed on the fixing bracket to synchronously rotate with the display. The fixed cam can engage with the rotational cam by the two positioners and is slidably coupled to the shaft.

The positioners are symmetrically formed between the rotational cam and the fixed cam to lock the rotational cam for fixing the display when the display is parallel to the base. Each of the positioners is composed of a protruding block and a concave. The protruding block is preferably formed on the rotational cam and the concave is preferably formed on the fixed cam to engage with the protruding block correspondingly when the display is parallel to the base, thereby locking the display to the base at 0, 180, or 360 degrees.

The two-way auto-locking tablet PC hinge further includes a spring washer coupling to the shaft to push the fixed cam toward the rotational cam so as to automatically engage the concave of the fixed cam with the protruding block of the rotational cam and lock the display when the concave is close to the protruding block. The two-way auto-locking tablet PC hinge further includes an auxiliary bracket rotatably coupling to the shaft, and the auxiliary bracket has an auxiliary bracket protrusion to couple to a fixing bracket opening of the fixing bracket to allow the auxiliary bracket to slide on the shaft and support the fixing bracket. In addition, two friction washers slidably coupling to the shaft are preferably disposed on two sides of the auxiliary bracket to increase a frictional force while rotating the fixing bracket and the auxiliary bracket.

The shaft further includes a shaft fixing surface, and the fixed cam and the friction washers further include a cam fixing surface and friction washer fixing surfaces respectively, thereby enabling the fixed cam and the friction washers to slide on the shaft without rotations.

Accordingly, the auto-locking tablet PC hinge of the present invention can lock either face of the display on the base of the tablet PC without any exposed hook. The auto-locking mechanism is hidden in the hinge and provides the frictional force for positioning the display. Hence, the two-way auto-locking tablet PC hinge of the present invention can allow the display be quickly and easily opened or closed in various conditions. The two-way auto-locking tablet PC hinge of the present invention not only allows the user to conveniently operate the display of the tablet PC but also allows the display to stably fix on the base of the tablet PC. Therefore, the users can operate the tablet PC more quickly and reliably.

BRIEF DESCRIPTION OF THE DRAWINGS

The foregoing aspects and many of the attendant advantages of this invention are more readily appreciated as the same become better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
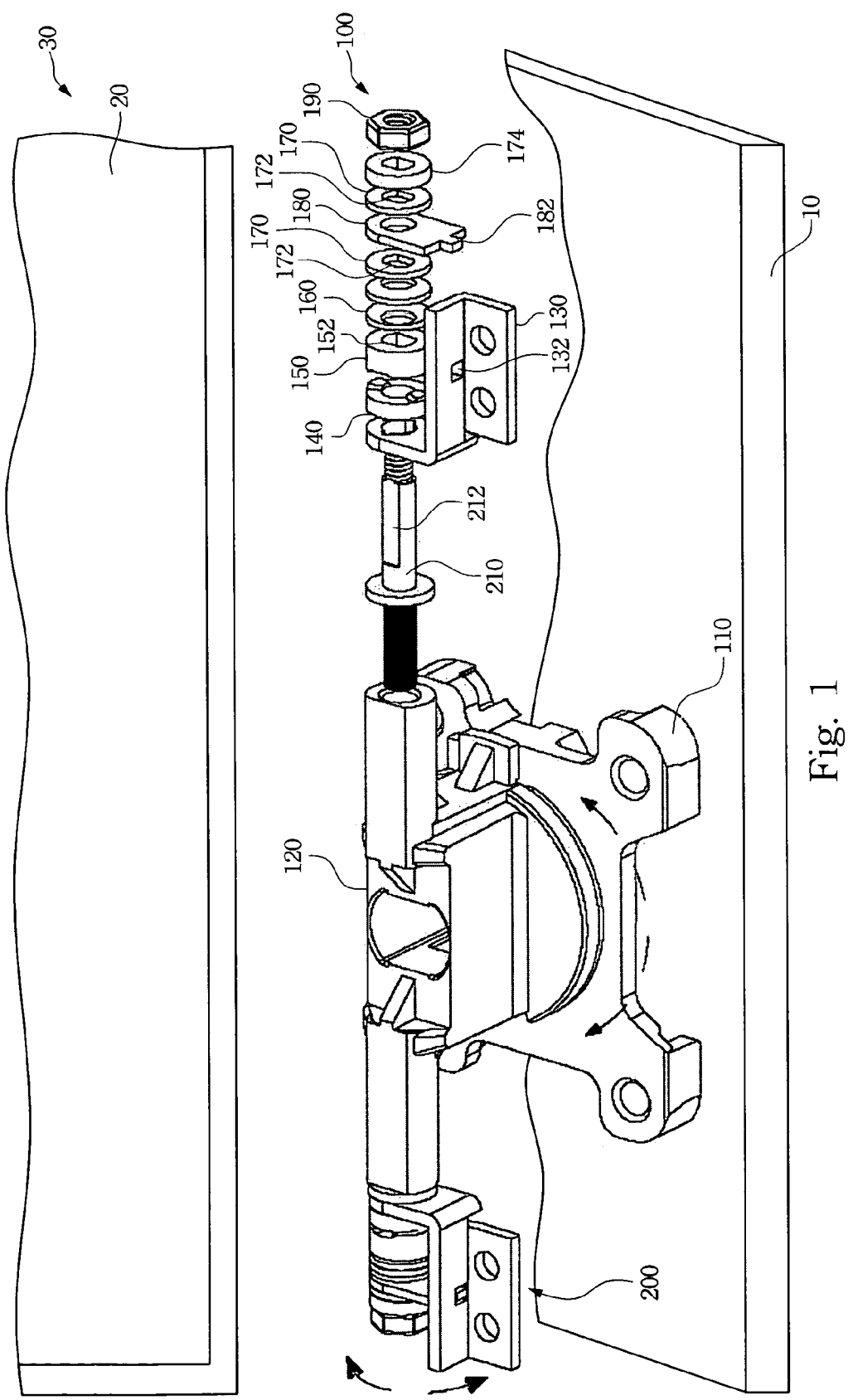
FIG. 1 is an exploded view of a two-way auto-locking tablet PC hinge according to the present invention.

FIG. 1 illustrates an exploded view of a two-way auto-locking tablet PC hinge according to the present invention. The two-way auto-locking tablet PC hinge according to the present invention includes a hinge base 110, a central rotational frame 120, a fixing bracket 130, a shaft 210, and an auto-locking mechanism 100. The hinge base 110 is fixed on the base of a tablet PC and the fixing bracket 130 is coupled to a display of the tablet PC. The shaft 210 is coupled to the central rotational frame 120 and the fixing bracket 130 is rotatable on the shaft 210. The central rotational frame 120 can rotate on the hinge base 110 so that the display can be rotated on the base of the tablet PC.

The display 20 fixed on the fixing bracket 130 can therefore rotate around the shaft 210 to open or close the display 20 from the base 10 of the tablet PC 30. In addition, the display 20 can utilize the central rotational frame 120 to rotate on the hinge base 110 and the base 10 of the tablet PC 30. Accordingly, the display 20 can easily adjust a vertical angle and a horizontal angle on the tablet PC 30.

The auto-locking mechanism 100 further includes a rotational cam 140, a fixed cam 150, a spring washer 160, friction washers 170, an intermediate washer 174 and a threaded nut 190. One end of the rotational cam 140 is fixed with the fixing bracket 130 and another end thereof is coupled to the fixed cam 150 to provide the two-way auto-locking functionality for the display of the tablet PC. The spring washer 160 and the friction washer 170 are coupled to the shaft 210 and disposed on another side of the fixed cam 150 opposite to the rotational cam 140. In addition, a threaded nut 190 is fixed to the shaft 210 to tighten the foregoing components on the shaft 210. After the foregoing components are coupled on the shaft 210, the auto-locking mechanism 100 is similarly formed on the left side of FIG. 1 as the assembled auto-locking mechanism 200.

The spring washer 160 provides pressure on the fixed cam 150 for tightly coupling the fixing cam 150 to the rotational cam 140. Accordingly, the display of the tablet PC can be laid and locked on the base of the tablet PC with the auto-locking mechanism 100 when the display faces up or down and closes on the base of the tablet PC.

In the central portions of the fixed cam 150 and the friction washer 170, the fixed cam 150 and the friction washer 170 further include a cam fixing surface 152 and a friction washer fixing surface 172 respectively to couple to a shaft fixing surface 212 of the shaft 210. Therefore, when the display and the fixing bracket 130 are rotated, the fixed cam 150 and the friction washer 170 are constrained to avoid rotating the other component, e.g. the threaded nut 190, so as to effectively avoid loosening the auto-locking mechanism 100.

The auto-locking mechanism 100 further includes an auxiliary bracket 180 coupled to the shaft 210. A bracket protrusion 182 of the auxiliary bracket 180 is further coupled to an opening 132 of the fixing bracket 130 to allow the auxiliary bracket 180 to horizontally move along the shaft 210 and provide an auxiliary force for the fixing bracket 130 to improve the rotating stability of the display while rotating the display. The auxiliary bracket 180 can increase a total strength and a frictional area for assisting the fixing bracket 130 to provide an adequate and stable torque for rotating the display. Between the threaded nut 190 and the auxiliary bracket 180, an intermediate washer 174 is coupled and locked to the shaft 210 to avoid the auxiliary bracket 180 rotating and loosening the threaded nut 190 when the fixing bracket 130 is rotated. In addition, a lock nut can be adopted to further avoid loosening the threaded nut 190. Because both sides of the auxiliary bracket 180 can be installed friction washers 170 to increase the friction force for rotating the fixing bracket 130 and the auxiliary bracket 180, the torque for rotating the display is increased so as to effectively avoid an unexpected rotation of the display.

Figure 2A:
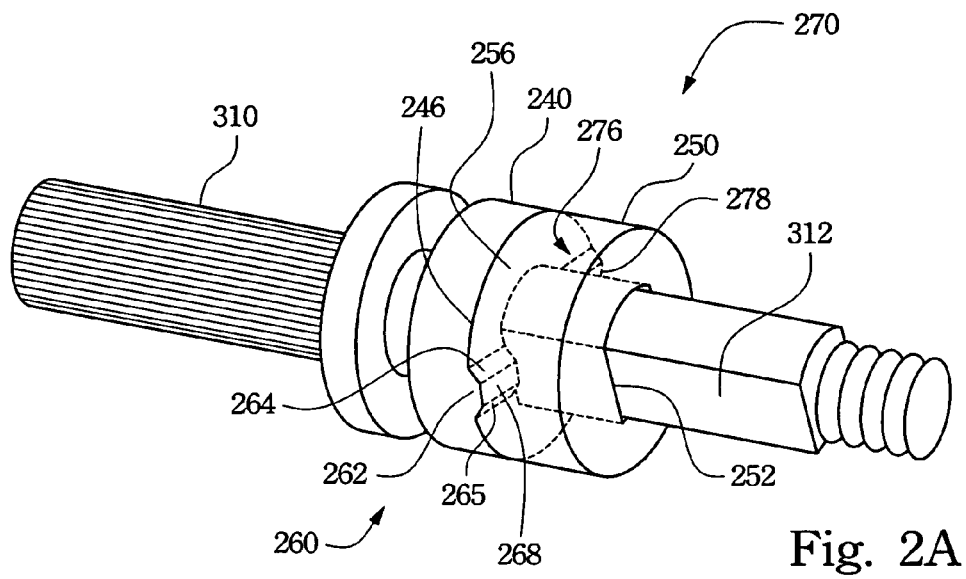
FIGS. 2A to 2C are partial enlarged views of the two-way auto-locking tablet PC hinge according to the present invention.
Figure 2B:
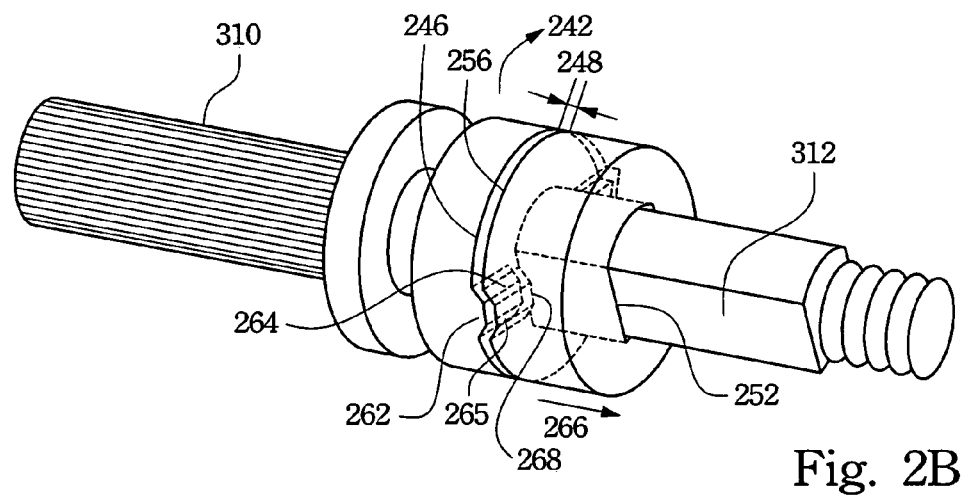
Figure 2C:
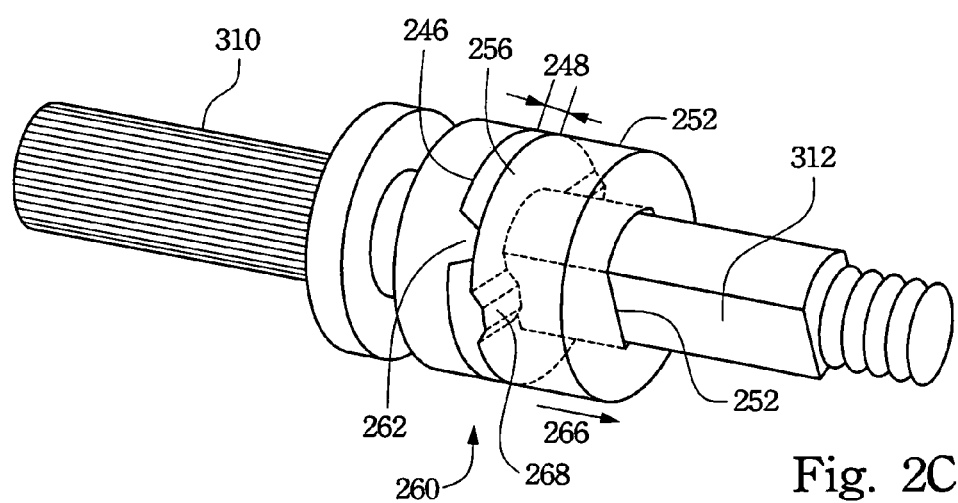

FIGS. 2A to 2C illustrate partial enlarged views of the two-way auto-locking tablet PC hinge according to the present invention to explain the operation principle thereof. The rotational cam 240 and fixed cam 250 of the auto-locking mechanism are coupled to the shaft 310. The rotational cam 240 is fixed on the fixing bracket (referring to FIG. 1) and rotated on the shaft 310 when the fixing bracket is rotated. In addition, the fixed cam 250 utilizes the cam fixing surface 252 to fixedly couple to the shaft fixing surface 312 of the shaft 310, and therefore the rotational cam 240 can rotate around the shaft 310 without driving the fixed cam 250 to rotate around the shaft 310.

On the rotational cam 240 and the fixed cam 250, a first positioner 260 and a second positioner 270 are formed. The first positioner 260 and the second positioner 270 are axially symmetrically disposed between the rotational cam 240 and the fixed cam 250 and around the shaft; that is, the first positioner 260 and the second positioner 270 are separated by about 180 degrees. The first positioner 260 is composed of a first protruding block 262 and a first concave 268, and the second positioner 270 is composed of a second protruding block 276 and a second concave 278. When the rotational cam 240 is rotated along a rotational direction 242, the first protruding block 262 is forced out of the first concave 268 and the fixed cam 250 is pushed toward a direction 266. When the fixed cam 250 is pushed along the direction 266, the spring washer (referring to FIG. 1) is deformed and therefore provides a force on the fixed cam 250 so as to restrain the first protruding block 262 from moving out of the first concave 268. By adjusting a first inclined plane 264 and a stiffness value of the spring washer, a desired release torque can be determined to effectively prevent the first protruding block 262 from being unexpectedly moved out of the first concave 268 and the second protruding block 276 from being unexpectedly moved out of the second concave 278.

Referring to FIG. 2B, when a first inclined plane 264 and a second inclined plane 265 of the first protruding block 262 do not escape from the first concave 268, the rotational cam 240 can automatically maintain a closed situation, referring to the situation illustrated in FIG. 2A, due to the functionalities of the first inclined plane 264 and the spring washer. Therefore, when the display is closed on the base of the tablet PC, the display can stably stay in the closed position until a user opens the display from the base.

When the user desires to operate the tablet PC, the user only needs to rotate the upper cover of the tablet PC around the shaft 310; that is, to rotate the rotational cam 240 along the rotational direction 242. The torque exerted by the user forces the first protruding block 262 out of the first concave 268 and the second protruding block 276 out of the second concave 278. When top surfaces of the first protruding block 262 and the second protruding block 276 are moved to bottom surfaces 256 of the fixed cam 250, lock surfaces 246 of the rotational cam 240 are separated from the bottom surface 256.

Due to an increase of a gap 248, the force on the fixed cam 250 is increased while the torque for rotating the rotational cam 240 is also increased until the first protruding block 262 and the second protruding block 276 touch the bottom surface 256. When the first protruding block 262 and the second protruding block 276 contact the bottom surface 256 to provide a surface contact therebetween, a predetermined friction force is determined thereon. The torque for rotating the rotational cam 240 can maintain a predetermined torque because the gap 248 maintains a predetermined interval and the friction force maintains the predetermined friction force. The predetermined torque can effectively avoid an unintentional movement of the display and fix the display in the desired working angle.

When the rotational cam 240 is relatively rotated about the fixed cam 250 about 180 degrees, the first protruding block 262 is rotated to a position of the second concave 278. Due to the functionality of the first inclined plane 264, the first protruding block 262 of the rotational cam 240 slides into the second concave 278 along the first inclined plane 264 to engage with the second concave 278. In the same manner, the second protruding block 276 automatically engages with the first concave 268. Therefore, the display of the tablet PC is faced upwardly and steadily fixed in this position. In conjunction with the rotation of the central rotational frame (referring to FIG. 1), the display of the tablet PC is laid on the base of the tablet PC so as to allow the user to conveniently handwrite on the display.

The two-way auto-locking tablet PC hinge according to the present invention couples the display to the base to enable the display to face downwardly and close on the base, or reversely rotate the display to face upwardly and lay on the base for handwriting. Since there is no hook protruding from the display, the appearance of the display of the tablet PC is smoother than that of conventional tablet PCs and the display can be easily opened and closed without an additional switch operation. When the display is almost parallel with the base, the first positioner and the second positioner of the auto-locking mechanism can automatically force the display parallel with the base, for example, an included angle about 0, 180 or 360 degrees therebetween. In addition, the display and the base can steadily stay in a position, for example, closed or a horizontally opened, until the user rotates the display.

The two-way auto-locking tablet PC hinge according to the present invention can quickly close the display of the tablet PC on the base thereof and conveniently reversely rotate the display to face up and close on the base. The two-way auto-locking tablet PC hinge according to the present invention has no hook protruding from the display, so as to beautify and smoothen the appearance of the display and allow the tablet PC to be operated conveniently by users.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A two-way auto-locking tablet PC hinge, comprising:
   a hinge base coupled to a base of a tablet PC;
   a central rotational frame coupled to the hinge base for rotating the central rotational frame on the hinge base;
   a shaft fixed with the central rotational frame;
   a fixing bracket rotatably coupled to the shaft and further coupled to a display of the tablet PC;
   a rotational cam rotatably coupled to the shaft and fixed on the fixing bracket so as to synchronously rotate with the display;
   a fixed cam for engaging with the rotational cam and slidably coupled to the shaft;
   two positioners symmetrically formed between the rotational cam and the fixed cam so as to lock the display to the base when the display is parallel to the base;
   a threaded nut screwed on one end of the shaft to push the fixed cam; and
   an intermediate washer locked to the shaft and disposed between the threaded nut and the fixing bracket so as to prevent the threaded nut from being loosened when the fixing bracket is rotated.

2. The two-way auto-locking tablet PC hinge of claim 1, wherein each of the positioners further comprises:
   a protruding block formed on the rotational cam; and
   a concave formed on the fixed cam to engage with the protruding block correspondingly when the display is parallel to the base so as to lock the display to the base at an angle of 0, 180, or 360 degrees.

3. The two-way auto-locking tablet PC hinge of claim 2, further comprising:
   a spring washer coupled to the shaft to push the fixed cam toward the rotational cam so as to automatically engage the concave of the fixed cam with the protruding block of the rotational cam and lock the display when the concave is close to the protruding block.

4. The two-way auto-locking tablet PC hinge of claim 1, further comprising:
   a fixing bracket opening formed on the fixing bracket; and
   an auxiliary bracket disposed between the fixed cam and the threaded nut and coupled to the shaft, the auxiliary bracket comprising an auxiliary bracket protrusion to be coupled to the fixing bracket opening to allow the auxiliary bracket to slide on the shaft and support the fixing bracket.

5. The two-way auto-locking tablet PC hinge of claim 4, wherein the shaft further comprises a shaft fixing surface and the fixed cam further comprises a cam fixing surface to allow the fixed cam to slide on the shaft without a rotation.

6. The two-way auto-locking tablet PC hinge of claim 5, further comprising two friction washers, wherein the auxiliary bracket is disposed between the two friction washers to increase a frictional force while the fixing bracket and the auxiliary bracket are rotated.

7. A two-way auto-locking tablet PC hinge, comprising:
   a shaft fixed with a central rotational frame of a tablet PC;
   a fixing bracket rotatably coupled to the shaft and further coupled to a display of the tablet PC, the fixing bracket having a fixing bracket opening;
   a rotational cam rotatably coupled to the shaft and fixed on the fixing bracket so as to synchronously rotate with the display;
   a fixed cam for engaging with the rotational cam and slidably coupled to the shaft;
   two positioners symmetrically formed between the rotational cam and the fixed cam so as to lock the display to the base when the display is parallel to the base; and an auxiliary bracket rotatably coupled to the shaft and comprising an auxiliary bracket protrusion, the auxiliary bracket protrusion being coupled to the fixing bracket opening so as to allow the auxiliary bracket to slide on the shaft and support the fixing bracket.

8. The two-way auto-locking tablet PC hinge of claim 7, wherein each of the positioners further comprises:
   a protruding block formed on the rotational cam; and
   a concave formed on the fixed cam to engage with the protruding block correspondingly when the display is parallel to the base so as to lock the display to the base at an angle of 0, 180, or 360 degrees.

9. The two-way auto-locking tablet PC hinge of claim 8, further comprising:
   a spring washer coupled to the shaft to push the fixed cam toward the rotational cam so as to automatically engage the concave of the fixed cam with the protruding block of the rotational cam and lock the display when the concave is close to the protruding block.

10. The two-way auto-locking tablet PC hinge of claim 9, further comprising:
    a threaded nut screwed on one end of the shaft to force the spring washer to push the fixed cam; and
    an intermediate washer interferingly coupled to the shaft to prevent the threaded nut from being loosened when the fixing bracket is rotated.

11. The two-way auto-locking tablet PC hinge of claim 7, wherein the shaft further comprises a shaft fixing surface and the fixed cam further comprises a cam fixing surface to allow the fixed cam to slide on the shaft without a rotation.

12. The two-way auto-locking tablet PC hinge of claim 7, further comprising two friction washers, wherein the auxiliary bracket is disposed between the two friction washers so as to increase a frictional force while the fixing bracket and the auxiliary bracket are rotated.

13. A tablet PC, comprising:
    a tablet PC base;
    a display; and
    a two-way auto-locking tablet PC hinge coupling the tablet PC base to the display to allow the display to horizontally and vertically rotate on the tablet PC base, wherein the two-way auto-locking tablet PC hinge further comprises:
    a hinge base coupled to the tablet PC base;
    a central rotational frame coupled to the hinge base for rotating the central rotational frame on the hinge base;
    a shaft fixed with the central rotational frame;
    a fixing bracket vertically rotatably coupled to the shaft and fixed to the display, the fixing bracket having a fixing bracket opening;
    a rotational cam rotatably coupled to the shaft and fixed on the fixing bracket to synchronously rotate with the display;
    a fixed cam for engaging with the rotational cam and slidably coupled to the shaft;
    two positioners symmetrically formed between the rotational cam and the fixed cam so as to lock the display to the tablet PC base when the display is parallel to the tablet PC base, wherein the two positioners further comprise two protruding blocks and two concaves; and
    an auxiliary bracket rotatably coupled to the shaft and comprising an auxiliary bracket protrusion, the auxiliary bracket protrusion being coupled to the fixing bracket opening to allow the auxiliary bracket to slide on the shaft and support the fixing bracket.

14. The tablet PC of claim 13, wherein the protruding blocks are formed on the rotational cam and the concaves are formed on the fixed cam to engage with the protruding blocks correspondingly when the display is parallel to the base so as to lock the display to the base at an angle of 0, 180, or 360 degrees.

15. The tablet PC of claim 14, wherein the two-way auto-locking tablet PC hinge further comprises:
    a spring washer coupled to the shaft to push the fixed cam toward the rotational cam so as to automatically engage the concaves of the fixed cam with the protruding blocks of the rotational cam and lock the display when the concaves are close to the protruding blocks.

16. The tablet PC of claim 15, wherein the two-way auto-locking tablet PC hinge further comprises:
    a threaded nut screwed on one end of the shaft to force the spring washer to push the fixed cam;
    two friction washers, the auxiliary bracket being disposed between the two friction washers so as to increase a frictional force while the fixing bracket and the auxiliary bracket are rotated; and
    an intermediate washer interferingly coupled to the shaft to prevent the threaded nut from being loosened when the fixing bracket is rotated.

17. The tablet PC of claim 16, wherein the shaft further comprises a shaft fixing surface, the fixed cam further comprises a cam fixing surface, and the friction washers further comprise friction washer fixing surfaces to allow the fixed cam and the friction washers to slide on the shaft without rotation.

* * * * *